(12) United States Patent
Rathod

(10) Patent No.: US 9,922,124 B2
(45) Date of Patent: Mar. 20, 2018

(54) ENABLE USER TO ESTABLISH REQUEST DATA SPECIFIC CONNECTIONS WITH OTHER USERS OF NETWORK(S) FOR COMMUNICATION, PARTICIPATION AND COLLABORATION

(71) Applicant: Yogesh Rathod, Mumbai (IN)

(72) Inventor: Yogesh Rathod, Mumbai (IN)

( * ) Notice: Subject to any disclaimer, the term of this patent is extended or adjusted under 35 U.S.C. 154(b) by 287 days.

(21) Appl. No.: 15/011,470

(22) Filed: Jan. 29, 2016

(65) Prior Publication Data
US 2016/0132608 A1    May 12, 2016

(51) Int. Cl.
| | | |
|---|---|---|
| G06F 3/00 | (2006.01) | |
| G06F 17/30 | (2006.01) | |
| H04L 29/08 | (2006.01) | |
| G06Q 30/02 | (2012.01) | |
| H04W 4/20 | (2018.01) | |

(52) U.S. Cl.
CPC ... *G06F 17/30867* (2013.01); *G06Q 30/0275* (2013.01); *H04L 67/306* (2013.01); *H04W 4/206* (2013.01)

(58) Field of Classification Search
None
See application file for complete search history.

(56) References Cited

U.S. PATENT DOCUMENTS

| | | | |
|---|---|---|---|
| 7,702,685 B2 | 4/2010 | Adel et al. | |
| 8,601,027 B2 * | 12/2013 | Behforooz | G06F 17/3053 707/790 |
| 2005/0021750 A1 | 1/2005 | Jonathan | |
| 2012/0316962 A1 | 12/2012 | Rathod | |

* cited by examiner

*Primary Examiner* — Jeffrey A Gaffin
*Assistant Examiner* — Ayesha Huertas Torres

(57) ABSTRACT

A methods, systems, device, network, platform and apparatus for enabling user(s) to connect contextually with any other users of network(s) based on matching user created and/or dynamic & automatic generated request data and/or user data with user request(s) and/or user data of other users of network and enabling connected users to conduct plurality types of activities, actions, transactions, events, interactions, registering, accessing, messaging, communication, sharing, searching, collaboration and participating activities of each others.

20 Claims, 4 Drawing Sheets

ENABLE USER TO ESTABLISH REQUEST DATA SPECIFIC CONNECTIONS WITH OTHER USERS OF NETWORK(S) FOR COMMUNICATION, PARTICIPATION AND COLLABORATION

This is a continuation of International Application PCT/IB2013/056716, with an international filing date of 18 Aug. 2013, having title: Enable user to establish request data specific connections with other users of network(s) for communication, participation & collaboration.

COPYRIGHTS INFORMATION

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever. The applicant acknowledges the respective rights of various Intellectual property owners.

FIELD OF INVENTION

The present invention relates generally to enabling addictive instant messaging or communication among anybody-to-anybody, anywhere, anytime any device for anything based on plurality of innovative ways, matchmaking algorithms & methods and contexts. Messaging and/or communication is enabled among users of network(s) based on matchmaking preferences, auto matchmaking, similar product and/or service users or customers, user's current activities, actions, senses, locations, transactions, events, places, languages, match making preferences, searching, selections, user inputs, user connections, contacts, relationships, affiliation, like minded users. Present invention enables user to communicate with anybody and not restricted to communicate with only known connections and contacts. This type of Instant messenger is dedicated to users who want to connect, communicate, collaborate & participate with anybody i.e. other users or likeminded users who are also like to connect, communicate, collaborate & participate with anybody based on plurality types of contexts, factors, rules, multidimensional environments, searching & match making algorithms, data analysis, data mining & text analysis, criteria, functions, keywords, locations, qualifications, income ranges, current places & locations, languages and user data. When user starts this addictive instant messenger that means they want to and like to communicate with any other users of network(s). Platform take care of disclosing of user identity, user's real profile, payment information, not like minded users, languages of text, text filtration, monitoring user's activities including message contents or words of message and automatically determining matchmaking, removal or blocking of unwanted users from communications sessions, channels or networks or platforms.

BACKGROUND OF THE INVENTION

At present users are using pluralities of instant messengers for communicating with connected or related users. Some instant messengers also enable users to search available unknown users for messaging or communicating with them.

None of the instant messenger enables users to connect, communicate and messaging among and/or with any other user(s) of instant messenger network(s) based on plurality of automatically and/or expert mediated and/or execution and using of one or more types of methods, modules, functions and/or instructions and/or determined context, semantic syntax, ontology, taxonomy, categories, user(s) requirements or real time or on demand sending of dynamic free form and/or structured request, domain or subject specific keywords database, artificial intelligence, categories, multi-dimensional environment, formatting, indexing, processing and analyzing & mining user data, keywords of or associate with messages, contents & user activities for communicating with particular types of users of network(s).

Present invention enables user to connect with inputted, selection, purpose, activity specific other contextual users which are note in user's connection or contact list and are not able to directly or indirectly connect, collaborate & communicate with them. User or requestor can determine requirement of connection types or send requirement request to server or server can monitors, tracks, detects, identifies, senses updates & stores user's activities, actions, events, senses, transactions, interactions, behavior, locations & user data and determine connections based on said user(s) related or associate data and/or request(s) data and connect user or requestor with other users or requestors to enabling them to conduct one or more types of contextual activities, actions, transactions, events, interactions, registering, accessing, messaging, communication, sharing, searching, collaboration and participating activities of each other. User can earn and/or purchase points, ranks & weights based on various types of factors, rules, policies & criteria and can connect particular number of times for particular number of users having particular ranks & weights for particular number and/or times of sessions.

Therefore, it is with respect to these considerations and others that the present invention has been made.

No prior art enables user of instant messenger or any types of communication interface to communicate, messaging and connect with real time and on demand requested users of network based on user's request data.

OBJECT OF THE INVENTION

The principal object of the present invention is to providing instant messenger to user which enables user to communicate and connect with any other users of network based on plurality of automatically and/or manually determined conditions, criteria, rules, factors, match making, preferences, filtration, categorization of users based on user's multidimensional data, user profile, user's activities, actions, events, transactions, free form of user's dynamic & real time requirement specification of connections, messaging and communications. User can input, search, match, select, select from text, use auto fill-up text, structured syntax or commands, list of pre-created keywords or sentences, templates for selecting and/or inputting and posting, requesting, publishing user's requirement of communications, messaging and connections. For example user input requirement that "I want to communicate and connect with Samsung Galaxy s4 users" and system automatically determined match users and availability of matched users who are using Samsung Galaxy s4 based on that users profile, user data, user's activities, actions, events, transactions, senses, behavior, interactions, locations, places, languages, identified mobile device(s) of user, user's social graph, user's generate data and any data related to user(s) and/or connected user(s) of user and connecting requested user(s) with said matched users.

The other principal object of the present invention is to enable to connecting anybody to anybody or any digital object to any other digital object based on plurality of contexts for conducting plurality types of activities, actions, transactions, events, interactions, registering, accessing, messaging, communication, sharing, searching, collaboration and participating activities of each other.

The other object of the present invention is to connecting nearly all users of internet and smart phones based on associate plurality types of contexts, need, requirements, locations, date & time, availability, matching user data and/or request data with other users' data and/or requests data for conducting plurality types of activities, actions, transactions, events, interactions, registering, accessing, messaging, communication, sharing, searching, collaboration and participating activities of each other.

DETAIL DESCRIPTION OF THE PREFERRED EMBODIMENT

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "receiving" requests, responses, communications and any types of multimedia contents from a device or component includes receiving the requests, responses, communications, and any types of multimedia contents indirectly, such as when forwarded by one or more other devices or components. Similarly, "sending" an item, requests, responses, communications, and any types of multimedia contents to a device or component includes sending the items, requests, responses, communications, and any types of multimedia contents indirectly, such as when forwarded by one or more other devices or components.

As used herein, the term "client application" refers to an application that runs on a client computing device. A client application may be written in one or more of a variety of languages, such as 'C', 'C++', 'C#', 'J2ME', Java, ASP.Net, VB.Net and the like. Browsers, email clients, text messaging clients, calendars, and games are examples of client applications. A mobile client application refers to a client application that runs on a mobile device.

As used herein, the term "network application" refers to a computer-based application that communicates, directly or indirectly, with at least one other component across a network. Web sites, email servers, messaging servers, and game servers are examples of network applications.

Briefly stated, the present invention is directed towards enabling connecting with anybody to anybody based on matching user's request(s) & user data with other user's request(s) and user data and connecting matched, relevant, contextual users for establishing communication links or communication sessions among request specific connected users for conducting plurality types of activities, actions, transactions, events, interactions, registering, accesses, messaging, communication, sharing, searching, collaboration and participating activities of one or more connected users.

Mechanisms of the invention enable user to access dedicate interface, web site, web page, application, service, apparatus, method, system, object, plug-in, integrated button, device, network, platform, framework, database, server for dynamically establishing request or purpose specific connection(s) with other user(s) of one or more networks, web sites, applications, services, servers, devices, databases for messaging, communication, collaboration, ask questions, provide answers, provide human services, provide and/or receive search results, share contents, collaboratively conduct searching, matching, payments, purchasing, consulting, and like.

In one embodiment present invention enabling user(s) to send request(s) data 401 for connecting with other users of network(s); determining user(s) of network(s) based on request(s) data; and enabling requestor user(s) and determined user(s) of network(s) to connecting, communicating, collaborating, sharing, searching, creating social network(s), participating with activities of and messaging with each other(s).

In one embodiment network(s) comprises communication, messaging & social network(s), users of networks, internet network, platforms, applications, services, web services, web sites, devices, databases, communication channels, peer to peer networks, visitors or guest users, set or pool or group(s) of registered and/or unregistered users.

In one embodiment enabling user to update or provide additional details or provider requested additional details for one or more request(s).

In one embodiment request(s) data 401 comprises user input(s) and/or user selections of/from keyword(s), user selections via one or more types of controls including list, combo box, check box, radio button, auto-fill keyword(s), template(s), script(s), pre-created or user created or system created or 3$^{rd}$ parties or experts created list(s), criteria, conditions, rules, search syntax, characters, words, phrases, sentence, commands, dictionaries, thesaurus, semantic syntax, structured query language (SQL) query, message, content, data structure, suggested or alternative request data or keywords, dynamically or auto generated list based on users senses, current locations & events, auto detecting users from video or voice, voice to text, digital pen to text, rich text format, video or image to text, match making preferences, privacy settings, ontologies, query or question, categories, taxonomies, structured data, database fields, database, user properties, attributes, context data, user profile, user connections or contacts, social graph data, user activities, actions, events, transactions, senses, behavior, interactions, locations, languages related data, list or contact list(s) of connected or related users, list or data of providers of products and/or services, brands, users, companies, organizations, schools, collages, class & year of schools and or collages, users of particular web sites, products, applications, services, devices, social networks, communications, search engines, e-commerce web sites and any types of entities and identification data, language selections, metadata, invitations, multi media types of data including image, video, photo, text, URL or Link, audio, music, icon, graphic, application, document, database, record of database, object, binary instruction and settings including connecting users with other users for particular request data as per schedule, connect me at particular date and/or time or ranges for particular request data, limiting number of connected users for particular request data, use my present or current locations & places, use my selective profile or user data or connected users data and any combination thereof.

In one embodiment determining of user(s) based on request(s) data of one or more user(s) and/or plurality types of requestor user(s)' data and/or connected user(s) of requestor user(s)' data and/or data of user(s) of network(s) and/or invitations and/or privacy settings, security policies, rights & privileges or permissions & preferences, past determined users, ranked or bookmarked users by requestor(s) and requestors of network(s).

In one embodiment request(s) data suggested and provided by one or connected or related users and/or users of network(s) and/or expert(s) and/or $3^{rd}$ parties' providers.

In one embodiment inviting or sending request message(s) or link(s) to one or more to non-users or non-members or sources to downloading, installing, using or accessing online and/or offline and/or subscribing and/or integrating and/or joining or registering with anybody, anywhere, anytime, any device for anything communication, participating with one or more types of activities, features, web sites, applications, services, databases, servers, devices, social networking & messaging network(s) based on user(s) request(s) and/or user(s) references.

In one embodiment requesting, determining, connecting conducting in real time and/or near real time.

In one embodiment requesting, determining, connecting, posting and sending or posting or publishing of contents to auto matched & connected users in one step.

In one embodiment enabling user(s) to post or share or publish or synchronize data or send inputted, drafted, edited, updated, selected instant message(s) and send request of matched users for connecting and communicating with them via single button.

In one embodiment enabling user(s) to directly use & access anybody, anywhere, anytime, any device for anything application(s), feature(s), button(s), service(s), web site(s), interface(s) via registration.

In one embodiment enabling user(s) to directly use & access anybody, anywhere, anytime, any device for anything application(s), feature(s), button(s), service(s), web site(s), interface(s) without registration.

In one embodiment enabling user(s) to send request first and then select or determine users from list of auto presented or determined users for connections and communications.

In one embodiment enabling user(s) to search, match, select, draft, save, edit, add, update and post one or more request(s) data.

In one embodiment enabling user(s) to communicate, connect and messaging with user(s) related to one or more request(s).

In one embodiment enabling user(s) to switch two or more request(s) specific connected or matched user(s) for communications and messaging.

In one embodiment dynamically adding or removing, presenting or hiding, maximizing or restoring or minimizing, cascading, ordering, opening closing & invoking send & received messages or contents or applications presentation interface based on switching.

In one embodiment dynamically and real time determining, updating and adding matched users for communication, participating, connecting and messaging with requestor(s) for each request.

In one embodiment dynamically and real time determining, updating and adding matched users are based on message contents, user availability, updating user(s) activities and user data.

In one embodiment enabling user to set privacy settings to limit number of users are connected for each request.

In one embodiment enabling user(s) to dynamically and/or real time add, invite and remove users from each communication session for each request.

In one embodiment enable user to connecting with other users of network(s).

In one embodiment limiting number of users who can connect with user.

In one embodiment enabling user to bookmark user(s) and/or invite or sent request for connection to user(s) for creating new connection(s) and/or add to contact(s) and/or provide rank(s), comments and categories to user(s) for commutation, messaging, chatting, calling, sending SMS, instant messaging, e-mailing, referring, asking for availability, request for detail or selective user data, participating with activities, creating social networks or groups and connecting for one or more purposes, tasks, workflow, questioning & answering, sending and/or receiving updates and like.

In one embodiment user comprises general user, user of network, registered user, un-registered user, connected or related user, visitor, group(s) of user(s), expert(s), administrator(s), web site(s), search engines, social networks, peer to peer networks, web page(s), application(s), web service(s), database(s), communication channels, device(s), server(s), automated source(s), automated destination(s), sensor(s), products and services providers, developers of applications & services, provider of data & contents and any types of entities including company, shop, mall, building, tree, organization, trust, government, press & media, and users on behalf of other user.

In one embodiment processing request data comprising formatting, indexing text data mining including text categorization, text clustering, concept/entity extraction, production of granular taxonomies, sentiment analysis, document summarization, and entity relation modeling (i.e., learning relations between named entities), text analytics including information retrieval, lexical analysis to study word frequency distributions, pattern recognition, tagging/annotation, information extraction, data mining techniques including link and association analysis, visualization, and predictive analytics to turn text into data for analysis via application of natural language processing (NLP) and analytical methods, analysis of data including process of inspecting, cleaning, transforming, and modeling data with the goal of discovering useful information, suggesting conclusions, and supporting decision making, converting to appropriate format including language, voice to text, text to voice, structured data, identify text data in image or video, validating & verifying text language and syntax of text, spell or grammar checking, determining, matching, identifying users or receivers for connecting requester(s) with matched user(s) of network(s) based on plurality types of factors including matching sender user's profile, user data, activities, actions, interactions, behavior, purpose, locations, events & transactions data, location, message(s) contents with prospective receiving users or users of network(s)' data, preferences, privacy settings, profile, location, activities, actions, interactions, behavior, purpose, locations, events & transactions data, calculating points & ranks earned by sender(s) and/or prospective receivers or users of network(s) for identifying & determining targeted receiving users or users of network(s) for connecting requestor with matched or determined users of network(s), identifying availability and presence information of prospective receivers or determined users of network(s), dynamically identifying current or updated priorities and limits of receiving messages of prospective receivers or determined users of network(s), applying privacy settings and preferences, associating metadata including keywords, categories, semantic syntax, ontologies, context data and system data including date & time.

In one embodiment message or contents of sender comprises one or more types of media including text, keywords, list, image, video, voice, photo, URL or link, audio, document, object, application, database, data record, template, forms and search result.

In one embodiment processing message(s) or content(s) comprises formatting, indexing, text data mining including text categorization, text clustering, concept/entity extraction, production of granular taxonomies, sentiment analysis, document summarization, and entity relation modeling (i.e., learning relations between named entities), text analytics including information retrieval, lexical analysis to study word frequency distributions, pattern recognition, tagging/annotation, information extraction, data mining techniques including link and association analysis, visualization, and predictive analytics to turn text into data for analysis, via application of natural language processing (NLP) and analytical methods, encrypting, decrypting, compressing, uncompressing, analysis of data including process of inspecting, cleaning, transforming, and modeling data with the goal of discovering useful information, suggesting conclusions, and supporting decision making, converting to appropriate format including language, voice to text, text to voice, structured data, identify text data in image or video, validating & verifying text language and syntax of text, spell or grammar checking, applying privacy settings and preferences, associating metadata including keywords, categories, semantic syntax, ontologies, context data and system data including date & time, associating or attaching or presenting contextual advertisements with message(s) or content(s), identifying and make available message associate link(s) associated or referred applications, services, objects, contents, data, functions, interfaces, & features.

In one embodiment enabling to integrate, embedded and access anybody, anywhere, anytime, any-device for anything connecting, communicating, participating & messaging interface with/to/at/in/on/by $3^{rd}$ parties web sites, web pages, applications, clients, services, devices and networks via web services, application programming interface (APIs), software development kit (SDK), web site, web page, buttons, plug-ins and any types of communication interfaces.

In one embodiment real time updating user's connections with other users' for messaging, communications, and participations based on adding or updating or removing of request data.

In one embodiment earning points by user(s) based on rank provided by other users of network(s), availability of user, rank of user's contents provided by other user(s) of network(s), number of times user connected with other users of network(s), number of times other users connected with user and total duration of communication, messaging & participation sessions of user with other users of network(s), purchasing of points by user(s) and receiving of points by user(s) from other users of network(s).

In one embodiment applying a set of theories, methodologies, processes, architectures, and technologies to transform raw data including user's all types of data into meaningful and useful information for business purposes.

In one embodiment enabling advertisers to preparing, presenting and providing in-line or in-text advertisements based on request data and/or message(s) and/or content(s) and/or user data.

In one embodiment enable to creating and updating of social graph of user(s) and/or network(s) and storing & updating information about and information associate with connections between/among nodes including connected users, identities, named entities or objects, applications, services, profile objects, type of contents.

In one embodiment information about connections between/among nodes includes monitoring, tracking, sensing, identifying, detecting, recording, storing, indexing, processing, structuring, formatting connected users activities, actions, transactions, contacts, events, interactions, senses, responses, requests, messages, communications, shared contents, behavior, locations, user generated content or data.

In one embodiment charging for advertisement(s) base on various models including cost per connection, cost per click, cost per actions, cost per impression and/or are based on number of users connected, number of users provide ranks & comments, number of user take one or more types of actions including view message(s), provide rank, click on message associate link(s), buy product(s) and/or service(s), register or install or subscribe or view or visit to/with advertiser's web site, feature(s) of web site, application, service, contents & web pages, respond or reply or share or refer to message(s), bookmark advertiser or message or content of advertiser(s) or add advertiser to user's persistent connections or contacts, number of times and length of duration of communications session(s) with connected users or prospective customers or customers or clients, total amount of purchases.

In one embodiment enabling advertiser(s) to bid for connecting with users or customers or prospective customers for particular keywords, categories, user request data, wherein server matches advertisement criteria including keywords, phrases, categories, location, language with user's data & request(s) data and prioritizing in connecting requestors or users or customers or prospective customers with advertisers or administrators or sales representatives of advertisers based on highest or updated or competitive bid(s).

In one embodiment providing searching functionality to users of network(s) to search & match users of network(s) based on one or more search criteria and preferences and enable to select from searched users of network for establishing connection with them based on invitation and/or purchasing selected connections or subscribing connections for dynamically search, match, use & access connections.

In one embodiment purchasing selected connections or subscribing access rights of connecting set of users comprises using subscribed or purchased selected connections for particular number of times, for particular type of activities, for advertising, marketing & conducting e-commerce transactions, access connection for particular period of time or duration and access as per one or associated, defined, customized rules, policies, agreements, permissions, access rights & privileges, subscription models & privacy settings In one embodiment enabling advertiser(s) to bid for presenting advertisement to users or customers or prospective customers for particular keywords, categories at one or more advertisement spaces or in-line with messages, wherein server matches advertisement criteria including keywords, phrases, categories, location, language with user's data & user's request(s) data and prioritizing in presenting advertisement(s) to requestor(s) or user(s) or customer(s) or prospective customer(s) based on highest or updated or competitive bid(s).

In one embodiment enable user(s) to send request(s) for connecting with other users from pool of users; receiving request(s) from user(s) for connecting with other user(s); determining connection(s) based on request(s); and connecting determined user(s) with requestor(s).

In one embodiment enabling connected users to conduct plurality types of activities, actions, events, interactions, workflow, tasks, transactions, registrations, participations including communications, messaging, sharing, accessing, linking, broadcasting, presenting, subscribing, making new connections, searching, matchmaking, selections, inputting, requesting, providing services, viewing, instructing, suggesting, publishing, participating with one or more activities, and collaboration with one or more connected users.

In one embodiment enabling user to send request or send initiation to one or more determined connected users for adding said one or more users to contact or connection list.

In one embodiment enabling user(s) to send request(s) from one or more 3$^{rd}$ parties' web sites, web pages, portals, platforms, applications, clients, services, web services, devices, networks, servers, social networks and databases.

In one embodiment enabling user(s) to connect with determined user(s) of one or more 3$^{rd}$ parties' web sites, web pages, portals, platforms, applications, clients, services, web services, devices, networks, servers, social networks and databases.

In one embodiment request comprising user input(s) and/or user selections of/from keyword(s), user selections via one or more types of controls including list, combo box, check box, radio button, auto-fill keyword(s), template(s), script(s), pre-created or user created or system created or 3$^{rd}$ parties or experts created list(s), criteria, conditions, rules, search syntax, characters, words, phrases, sentence, commands, dictionaries, thesaurus, semantic syntax, structured query language (SQL) query, message, content, data structure, suggested or alternative request data or keywords, dynamically or auto generated list based on users senses, current locations & events, auto detecting users from video or voice, voice to text, digital pen to text, rich text format, video or image to text, match making preferences, privacy settings, ontologies, query or question, categories, taxonomies, structured data, database fields, database, user properties, attributes, context data, user profile, user connections or contacts, social graph data, user activities, actions, events, transactions, senses, behavior, interactions, locations, languages related data, list or contact list(s) of connected or related users, list or data of providers of products and/or services, brands, users, companies, organizations, schools, collages, class & year of schools and or collages, users of particular web sites, products, applications, services, devices, social networks, communications, search engines, e-commerce web sites and any types of entities and identification data, language selections, metadata, invitations, multi media types of data including image, video, photo, text, URL or Link, audio, music, icon, graphic, application, document, database, record of database, object, binary instruction and settings including connecting users with other users for particular request data as per schedule, connect me at particular date and/or time or ranges for particular request data, limiting number of connected users for particular request data, use my present or current locations & places, use my selective profile or user data or connected users data and any combination thereof.

In one embodiment requestor(s) or user(s) or connected user(s) comprises general user, user of network, registered user, un-registered user, connected or related user, visitor, group(s) of user(s), expert(s), administrator(s), web site(s), search engines, social networks, peer to peer networks, web page(s), digital point or pixel or particular area or coordinator of device or interface, application(s), web service(s), database(s), communication channels, device(s), server(s), automated source(s), automated destination(s), sensor(s), products and services providers, developers of applications & services, provider of data & contents and any types of entities including company, shop, mall, building, tree, organization, trust, government, press & media, and users on behalf of other user.

In one embodiment determining connections based on request(s) comprising matching request(s) data and/or requestor's(s) data with data of pool of users.

In one embodiment user data comprises user profile, user generated data, shared data, user inputted, selected & disclose data, user activities, actions, events, behavior, current location(s) & place(s), transactions, interactions, senses and multidimensional environment related data and/or connected or related or associate users' data.

In one embodiment user data comprises content(s) or database(s) of web site(s) and/or server(s) of web site(s), application associate data, database(s), resources, device associate data, web service associate data, data of social network, data, resources, digital contents and index data of search engines, data provided, updated, inputted, synchronized, shared, published by registered and/or un-registered users, connected users, 3$^{rd}$ parties providers, developers, partners, service providers, connected users, experts, automated sources.

In one embodiment determining connections base on request(s) comprising searching, matching, filtering, selecting, associating, developing, customizing, installing, attaching, associating, integrating, loading, executing, running, processing, indexing, formatting, verifying, validating, syntax checking, intuiting, orchestrating, monitoring, tracking, subscribing, using, accessing, connecting, collaborating, communicating, applying, setting, calling, invoking one or more methods, systems, procedures, formulas, processes, analysis, modules, data, triggers, object-orientated technologies, routines, programming instructions or binary instructions, match making algorithms, business processes, data mining, data analysis, text analysis, applications, objects, functions, scripts, commands, privacy settings, preferences, security or privacy policies, rights & privileges, rules, APIs, SDKs, plug-ins, communication interfaces or channels or links or networks, web services, human services, devices, databases, networks, users, humans, experts for matching requestor(s) with other users of network(s).

In one embodiment determining connections based on request(s) comprising user(s) availability, points or levels or weights or ranks earned or purchased or possess by user(s), number of sessions, number of users connected, number of contacts or connections, selections or determining of users for request(s) specific connections by experts or administrators or users of networks or connected users of user, current or past location(s) of user, language(s) of user(s), user(s) device, user(s) clients, type(s) of membership(s) including premium, paid, subscribers, subscriptions, enterprise, seller, expert, volunteer, sponsored, advertised, general, guest, registered user, non-member or non-registered member & gift based members, user's social graph, connected or related or connected users of connected users of user, user's updated data, profile data, lists, categories, keywords, database, privacy settings, preferences, rights & privileges, user's current activities, actions, transactions, senses, locations, places, events, date & time, interactions, behavior, status, availability, nearness, participations and any combination thereof.

In one embodiment presenting advertisement(s) before or pre, while and after or post connecting users with request(s) to one or more types (s) interface(s) or client(s) or device(s) or application(s) of connected and request user(s).

In one embodiment sending, receiving, determining and connecting can take place in real time or near real time.

In one embodiment registering and/or identifying user(s) with anybody to anybody connection network(s) and/or platform(s) and/or application(s) and/or service(s) and/or web site(s) and/or web page(s) and/or server(s) and/or device(s); enabling user(s) to determine types of connections required and/or monitoring, tracking, detecting, identifying, accepting, collecting, organizing, filtering, orchestrating, recognizing, sensing, recording, indexing, processing and formatting user's one or more activities, actions, events, transactions, requests, search quires, preferences, privacy settings, match making preferences, interactions, behavior, senses, location, places, current location or place, communication, messaging, viewing, collaboration, access, connections, searching, sharing, processing, selections, inputs, tasks, workflows from/with/via/by/to/in/at/within one or more sources, applications, services, objects, profiles, web sites, web pages, sensors, devices, databases, servers, networks, social networks, peer to peer networks; enabling user(s) to send or update request for connecting requestor user(s) with other registered and/or identified user(s) of network(s) and/or automatically sent or update request(s) to enabling user(s) to connect with other registered and/or identified user(s) of network(s); determining connection(s) based on request(s); and connecting determined user(s) with requestor(s).

In one embodiment types of connections required comprises requirements of user to connect with one or more user(s) of network(s) for one or more types of activities, user(s) actions, interactions, transactions, events, workflows, tasks, searching sharing, participating collaboration, communication, establishing communication sessions, conduct transactions and messaging.

In another important embodiment dynamically enable digital object(s) or digital point(s) to connect with other digital object(s) or digital point(s).

In another important embodiment dynamically enable digital object(s) or digital point(s) to connect with other digital object(s) or digital point(s) based on sent request(s) data for connecting with other digital object(s) or digital point(s).

In another important embodiment dynamically enabling digital object(s) or digital point(s) to connect with other digital object(s) or digital point(s) based on monitoring tracking detecting, identifying accepting, collecting organizing, filtering, orchestrating recognizing sensing, recording, indexing processing and formatting digital object'(s) or digital point(s)'s one or more activities, actions, events, transactions, requests, search quires, preferences, privacy settings, match making preferences, interactions, behavior, senses, location, places, current location or place, communication, messaging, viewing, collaboration, access, connections, searching, sharing, processing, selections, inputs, tasks, workflows from/with/via/by/to/in/at/within one or more sources, applications, services, objects, profiles, web sites, web pages, sensors, devices, databases, servers, networks, social networks, peer to peer networks and sending said data for matching other digital object(s) or digital point(s) for dynamically enabling digital object(s) or digital point(s) to connect with other digital object(s) or digital point(s).

In another important embodiment dynamically enable digital object(s) or digital point(s) to connect with other digital object(s) or digital point(s) based on privacy settings, preferences, rights & privileges, invitation(s), requesting, payments, partnerships, negotiations.

In another important embodiment dynamically enable digital object(s) or digital point(s) to connect with other digital object(s) or digital point(s) based on or via application programming interface(s) (APIs), web services, plug-ins, and one or more types of communication interfaces, channels, modules, applications, services, networks, & devices.

In another important embodiment digital object(s) or digital point(s) comprises pixel, web site, web page, object, module, function, routines, computer programming, application, service, web service, device, database, server, controls including textbox, button, check box, radio button, list box, combo box, edit box & one or more types of controls and one or more type of multimedia content including video, image, photo, text, document, voice, audio, binary instruction, URL or link.

In another important embodiment enabling connected digital object(s) or digital point(s) to conduct one or more types of activities, actions, interactions, transactions, events, workflows, tasks, searching, sharing, participating, collaboration, communication, messaging, synchronizing of data, presenting contents, sending requests including request for registering digital object(s) or digital point(s) and/or users of digital object(s) or digital point(s), request for search result based on search query, request for selective user data & payment information, receiving responses, sending and/or receiving search results, comments, reviews, user data, user profile, user connections, user activities related data, payment information of user(s), accessing data, uploading and/or downloading applications, contents, providing and/or consuming services, subscribing connected one or more digital object(s) or digital point(s), executing and/or processing commands, binary instructions, parameters.

In another important enable connected digital object(s) or digital point(s) to connect with other connected digital object(s) or digital point(s) up-to particular number of degrees or depths.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE DRAWINGS

Illustrative Operating Environment

Figure 1:
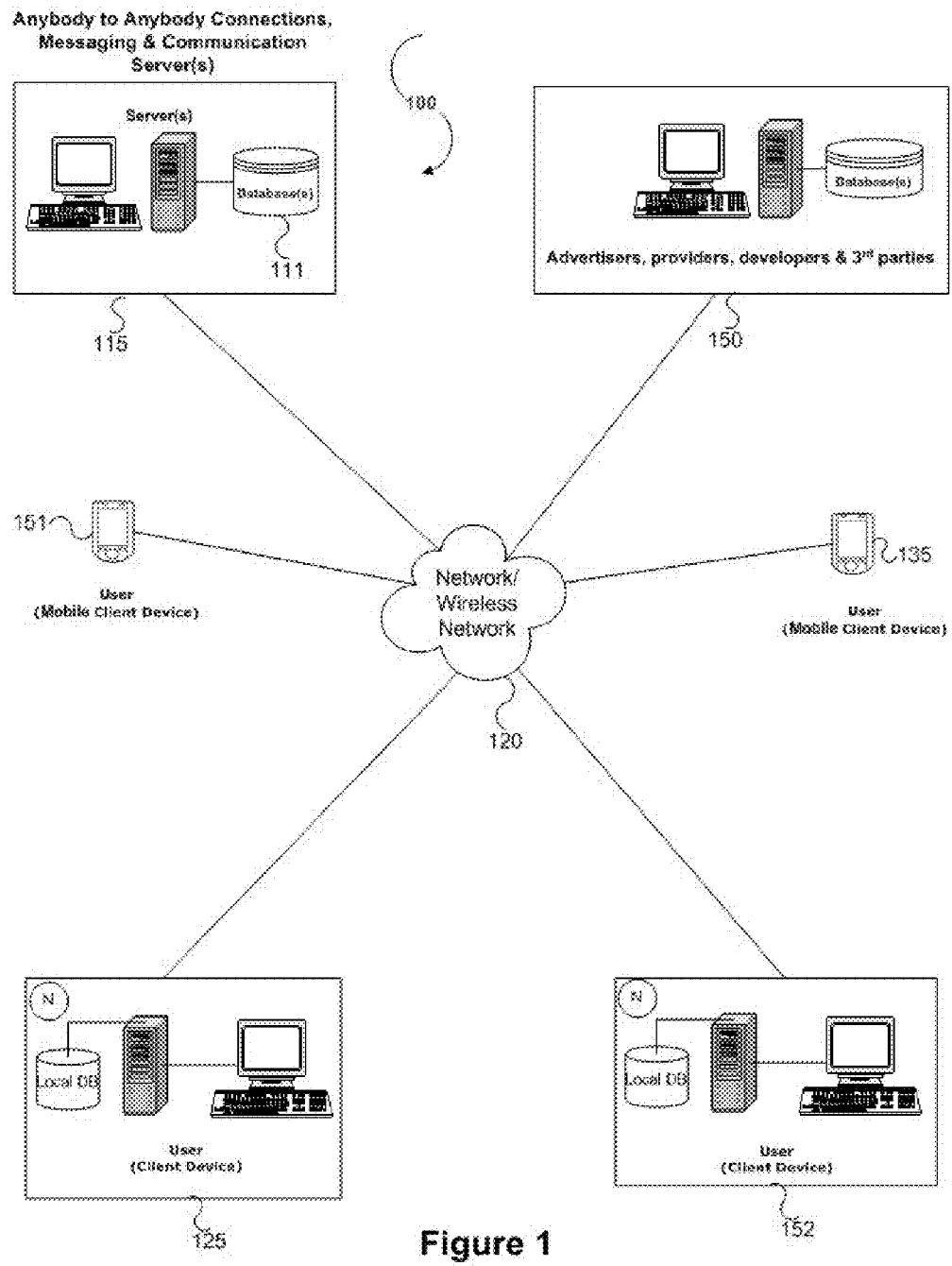
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes a client device, in particular mobile device 151 & 135 and personal computer 125 & 152. The system also includes network or wireless network 120, central server 115, Advertisers, providers, developers & 3rd parties' Server (s) 150, and client devices 151 & 152 and 125 & 135.

A variety of client devices may be employed in accordance with the invention. The client devices may include mobile devices, smart phones, smart devices, tablets, PCs, digital home clients such as personal computers and media centers, and other client devices. Generally, mobile device 135 may include virtually any portable computing device capable of receiving and sending a message over a network, such as network 120, or the like. Mobile device 135 may also be described generally as a client device that is configured to be portable. Mobile device 135 may have the capability of connecting to a network using wireless technology, wired technology, or a combination of both wired and wireless technologies. Thus, mobile device 135 may include virtually any portable computing device capable of connecting to another computing device and receiving information. Such devices include portable devices such as cellular telephones, smart phones, display pagers, radio frequency (RF) devices, infrared (IR) devices, Personal Digital Assistants (PDAs), handheld computers, sensors, laptop computers, wearable computers, tablet computers, integrated devices combining one or more of the preceding devices, and the like. As such, mobile device 135 typically ranges widely in terms of capabilities and features. For example, a cell phone may have a numeric keypad and a few lines of monochrome LCD display on which only text may be displayed. In another example, another cell phone or web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, video, multimedia, and the like, employing virtually any web based language or protocol, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile device 135 may include one or more other client applications that are configured to receive content from another computing device. The client application may include a capability to provide and receive textual content, graphical content, audio content, video content, and the like. The client application may further provide information that identifies itself, including a type, capability, name, and the like. In one embodiment, mobile device 135 may uniquely identify itself through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to central server 115 or other computing devices.

Mobile device 135 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as central server 115, another web server, or the like. However, the present invention is not limited to these message protocols, and virtually any other message protocol may be employed.

Mobile device 135 may be further configured to enable a user to participate in communications sessions, such as IM sessions. As such, mobile device 135 may include a client application that is configured to manage various actions on behalf of the client device. For example, the client application may enable a user to interact with the browser application, email application, IM applications, SMS application, and the like. Generally, instant messaging provides ability for at least two computing devices to exchange messages in real time.

Mobile device 135 may further be configured to include a client application that enables the end-user to log into an end-user account that may be managed by a network application. Such an end-user account, for example, may be configured to enable the end-user to receive emails, send/receive IM messages, SMS messages, and access selected web pages, maintain a digital wallet, or the like.

Network 120 is configured to couple mobile device 135, 151 & Personal Computer 125 & 152, as well as other client devices not illustrated, and their components, with other network devices, such as central server 115, and the like. Network 120 is configured to couple responder client devices including mobile phone 135, 151 & Personal Computer 125 & 152 with central server 115.

Though for illustrative purposes network and wireless network are shown combined, in various environments employing the present invention, network and wireless network 120 may be the separate or same network, different networks, or different networks including a combination of overlapping components and distinct components. The discussion herein that describes network 130 may therefore be applicable to describe network 120.

Network 120 may include any of a variety of wired or wireless sub-networks that may further overlay stand-alone ad-hoc networks, and the like, to provide an infrastructure-oriented connection for mobile device 135. Such sub-networks may include mesh networks, Wireless LAN (WLAN) networks, cellular networks, and the like. Additionally, network 120 may connect to mobile devices with a wired connection, such as cable, phone lines, Ethernet wires, and the like. Network 120 may include wide area networks, such as the Internet. The invention may be used either generally with networks, specifically with wireless networks, or with various combinations of wireless and wired networks.

Network 120 may further include an autonomous system of terminals, gateways, routers, and the like connected by wireless radio links, and the like. These connectors may be configured to move freely and randomly and organize themselves arbitrarily, such that the topology of network 120 may change rapidly.

Network 120 may further employ a plurality of access technologies including 2nd (2G), 3rd (3G), 4th (4G) generation radio access for cellular systems, WLAN, Wireless Router (WR) mesh, and the like. Access technologies such as 2G, 3G, 4G, and future access networks may enable wide area coverage for mobile devices, such as mobile device 135 with various degrees of mobility. For example, network 120 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, network 120 may include virtually any communication mechanism by which information may travel between mobile device 135 and another computing device, network, and the like.

Network 120 may further include or employ one or more network gateways (not shown) that serve as intermediaries between mobile device 135 and other network devices, such as central server 115. A network gateway may receive data from a device or network, transform the data, and forward the data to another device or network. A network gateway may perform a transformation in more than one direction. Transformation may, for example, include modifying protocols or communications mechanisms in order to facilitate communication between two devices or two networks, each of which may employ differing protocols. A WAP gateway is one type of network gateway. A WAP gateway may facilitate communication between a first device that uses the Wireless Application Protocol (WAP), and a second device. The second device may, for example, communicate using the HyperText Transfer Protocol (HTTP). An SMS gateway is a network gateway that facilitates communication between a device using the Short Message Service (SMS) protocol and another device, such as one using HTTP. A WAP and SMS gateway combines the features of a WAP gateway and an SMS gateway.

In one embodiment, network 120 may include one or more components of a Anybody to Anybody Connections, Messaging & Communication Platform, Server, Application, Client, Service & Management Interface and service that operates to facilitate or enable to dynamically and/or request(s) data specific connecting with one or more users of one or more networks, web sites, applications, services, devices, databases for sending and/or receiving, routing, processing, formatting, indexing messages & contents, communications, shared contents, participate with one or more activities, actions, transactions, & events, search, match, select, register, upload, host, store, process, download, install, subscribe, attach, update, upgrade, share, present and access one or more applications, services, contents and/or link(s) of one or more applications, services, contents from plurality of sources, servers including Anybody to Anybody Connections, Messaging & Communication Server(s) 115, devices, databases including database(s) 111 connected to server(s) 115 and providers 150 to client devices including mobile devices 135, 151 and smart device 125 & 152 and central server 115.

FIG. 1 shows mobile device 135 communicating with central server 115, and central server 115 communicating with Applications, Services, Contents and $3^{rd}$ parties & Providers Server(s) 150. FIG. 1 also shows central server 115 communicating with client devices 135, 151, 125 & 152. Each of these communications may employ a direct connection, or one or more networks, or a combination thereof. For illustrative purposes, FIG. 1 show communication between central server 115 and Applications, Services, Contents and $3^{rd}$ parties & Providers Server(s) 150 employing network 120, however environments that include this communication may be employed with the present invention. In particular, central server 115 and Applications, Services, Contents and $3^{rd}$ parties & Providers Server(s) 150 may employ any one or more of direct communication, a local area network, or a wide area network, such as network 120.

A network enabling any one or more of the above communications may employ any form of computer readable media for communicating information from one electronic device to another. Also, the network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (IS-DNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the network includes any communication method by which information may travel between central server 115, Interfaces and Functions Providers Server(s), and Developers, Sponsors, Advertisers and Providers 150, client devices 151, 152, 125 & 135, and other computing devices (not shown).

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Client devices 151, 135, 125 & 152 are computing devices that may be employed by a user, referred to as a receiver and sender, for receiving and sending or sharing request(s) data, connections, contents and associate data and user instructions. A variety of sender and/or receiver client devices may be employed in accordance with the invention. Client devices may include mobile devices, digital home clients such as personal computers and media centers, and other client devices. Generally, clients may include virtually any computing device, portable or non-portable, capable of receiving and sending a message over a network, such as network 120, or the like. Clients may include devices such as mobile device 151 (135) described herein. Though FIG. 1 illustrates only four Clients 151, 135, 125 & 152, it is envisioned that the invention may be practiced in an environment that include a large community of sender and receiver clients. Thus, sender and receiver clients or members of network(s), application(s), service(s), web site(s), device(s), database(s) or provider or user or receiver may number in the hundreds, thousands, hundreds of thousands, millions, or virtually any number.

Though FIG. 1 illustrates an embodiment of a system having each of network central server(s) 115 and Anybody to Anybody Connections, Messaging & Communication Server(s) 150 as separate computing devices, the invention is not so limited. Software, hardware, or hardware-software combinations implementing any portion of these components may be combined with any other component on a single computing device, or arranged in a different manner among multiple computing devices. Some portion or all of the functionality of any component may be distributed or duplicated among multiple computing devices.

One embodiment of a network device that may be used to implement any one or more of central server 115 or Anybody to Anybody Connections, Messaging & Communication Server(s) 150 is described in more detail below in conjunction with FIG. 3. Briefly, however, such network devices may include any computing device capable of communicating with other network devices to enable network applications or web sites to process, send and respond to requests from client devices, such as mobile device 135 is described in more detail below in conjunction with FIG. 2. Devices that may operate as these network devices include personal computers desktop computers, multiprocessor systems, microprocessor-based or programmable consumer electronics, network PCs, servers, and the like, or any combination thereof.

FIG. 1 illustrates an embodiment of a system having an ads server (not shown). Briefly, an advertisings server provides advertisements, such as banner advertisings, application advertisings or other types of advertisements. An application advertisement is an advertisement that is associated with an interaction with an application. It is typically integrated with the application presentation in some way. A search advertising is an example of application advertisings. When a search is performed, a search application may select one or more ads based on the keywords of the search. The search application may combine search ads with the search results, and present them in an integrated manner. In some embodiments, the integration may be so complete that there is not a clear distinction between the search ads and the search results. In some embodiments, one or more ways of indicating the search ads may be included, such as text, color, line separators, and the like. Similarly, other applications may generate application ads. A mapping application, for example, may use the location specification in a request to generate advertisements based on the location, such as those of businesses in the area, and may display an advertisement on the map.

A banner advertisement typically is placed in a location that is separate from, or more distinguishable from, an application's results. For example, it may be at the top or bottom of a page, or along the margin. A banner advertisement may be selected based on criteria similar to those for an application ad, based on different criteria, or randomly selected Ads server (not shown) may have an associated ads database, which may be integrated or in communication with central server 150. An ads database may store data pertaining to advertisement contents, constraints, and rules pertaining to the use of each advertisement. At least a portion of the data stored in ads server may be specified by an advertiser. An advertiser may specify data describing the advertisement contents, constraints, and rules pertaining to the use of each advertisement.

Ads server may receive data or a set of parameters to use for determining whether to provide an advertisement, selecting and generating an advertisement, including data upon which various determinations are made. Selecting and generating an advertisement may include selecting an advertiser, selecting an advertisement associated with the advertiser, or selecting content to include in an advertisement. The data upon which these and other determinations may be based may include information derived from user data, user profile, information related to interactions among users and interfaces and function links and associate references nodes or objects received by the central server, and the like. The data upon which these and other determinations may be based may also include information about the user or mobile device, actions that the user or mobile device have taken, data pertaining to one or more advertisers, relevant events, and a variety of other types of information.

FIG. 1 illustrates an embodiment in which mobile device 135 communicates with central server 115. A user of mobile device 135, referred to as a provider and/or receiver of request data, messages, shared contents, applications, services & objects may employ mobile device 135 to send and/or receive request data, messages, shared contents, applications, services & objects to central server 115. Central server 115 may receive and process the request data, messages, shared contents, applications, services, and objects from mobile device 135. Central server 115 may select a set of connected or related users of user devices 151 and 152. Central server 115 may employ identifiers or addresses of senders and receivers devices, or both. It may, for example, employ a login name or email address of a sender and/or receiver. It may employ an IP address, MIN, or other identifier of a device. Central server 115 may employ any one or more of these identifiers or addressing mechanisms when communicating with a sender and/or receiver device. As used herein, unless the context clearly indicates otherwise, the term "sender" and "receiver" may be used to refer to a person, a device, or a combination of a person and a device.

Illustrative Client Device

Figure 2:
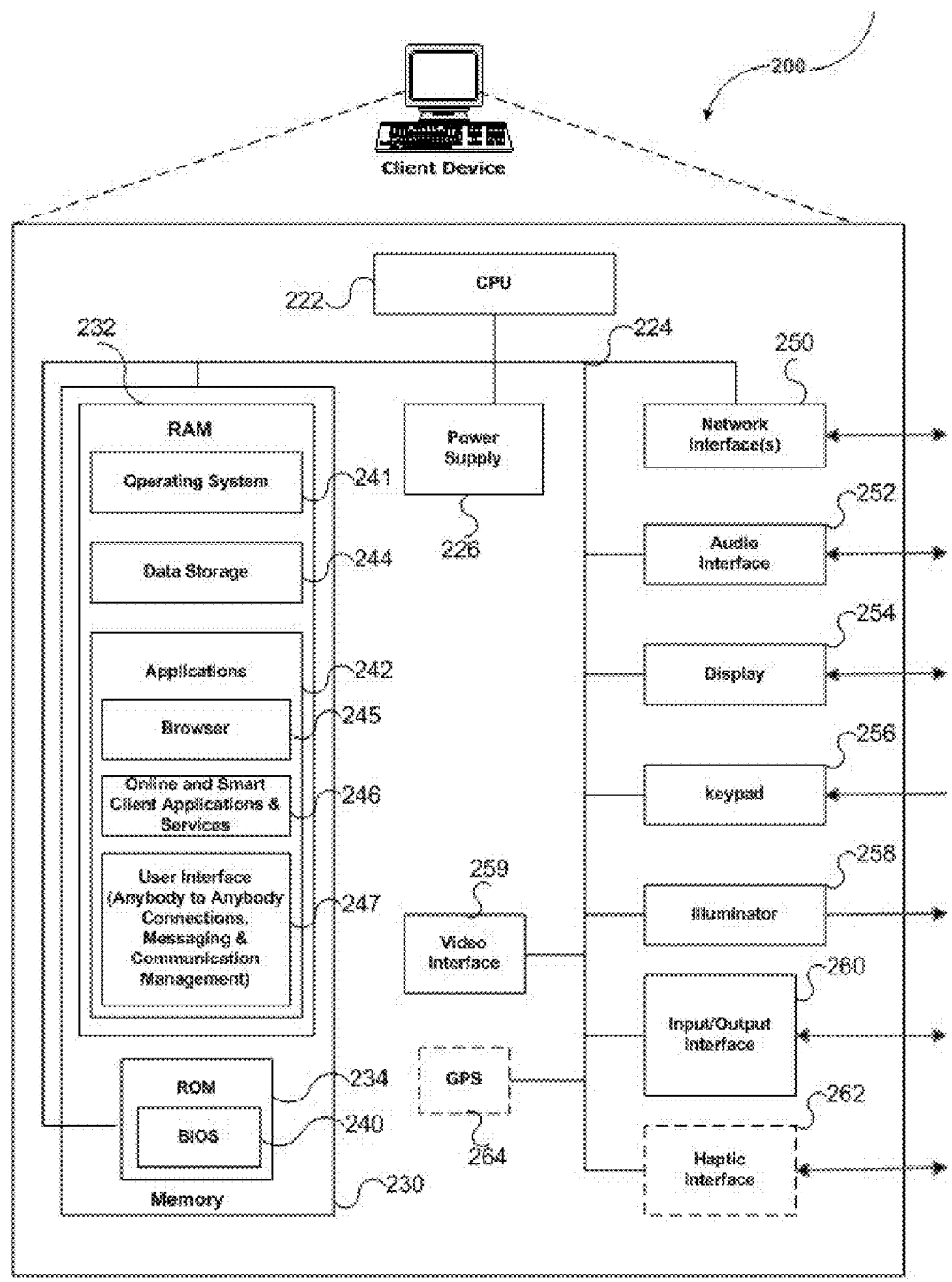
FIG. 2 shows one embodiment of a client device that may be employed in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, user client devices 151, 152, 125 and 135 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Optional haptic interface 262 is arranged to provide tactile feedback to a user of the client device. For example, the optional haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may, through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® Operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 including browser 245, online and smart client applications & services 246 and Anybody to Anybody Connections, Messaging & Communication Management User Interface 247 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store multimedia information and/or content for later publication, editing, or the like, as well as other information including address lists, contact lists, personal preferences, or the like. At least a portion of the content may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), content, and enable telecommunication with another user of another client device. Other examples of application programs include calendars, editors, email clients, IM applications, SMS applications, VOIP applications, contact managers, task managers, transcoders, database programs, word processing programs, security applications, spreadsheet programs, games, search programs, Anybody to Anybody Connections, Messaging & Communication Management application, service or interface and so forth. Applications 242 may further include browser 245. Browser 245 may include virtually any of a variety of client applications configured to receive and/or provide communications of web pages, and other content over a network. Browser 245 typically provides for a graphical display of various web pages, including user interfaces provided, in part, by another computing device over the network. Browser 245 may include a variety of security features, and/or other plug-in applications, modules, applets, scripts, or the like, to enable display of animation, videos, playing of audio files, or the like. Browser 245 and applications 242 are configured to enable a user or sender and/or receiver to send and/or connection receive request data for connecting users with requestor, share contents, send & receive messages, communicating with or register, search, match, select, install, subscribe, upload, download, update, upgrade, test, attach, associate and access one or more applications, services, contents from/to/on/by/with one or more sources, destinations, web sites, web pages, applications, services, objects, networks, databases, social networking, and devices based on privacy settings and preferences, match making preferences via sending/receiving to/from central server 115 of FIG. 1. Moreover, through one or more of applications 242 or Anybody to Anybody Connections, Messaging & Communication Management Application or Service or Interface 247, the requestor can input, select, search, match and send request data for connecting with other users of networks for communication, messaging, collaboration, sharing, searching, publishing, participating with activities of connected users, conducting one or more transactions, tasks, workflow and like.

Illustrative Network Device Environment

Figure 3:
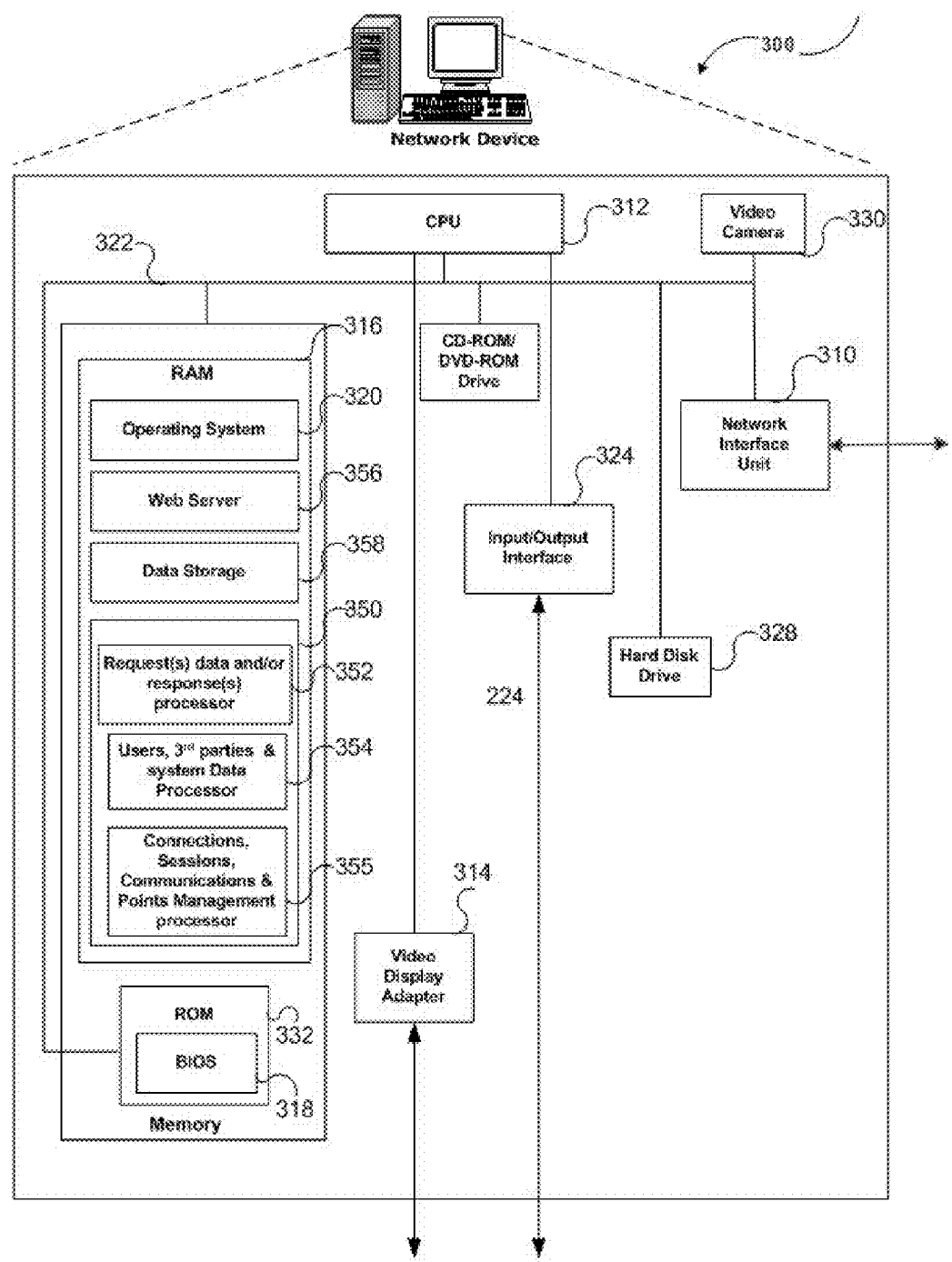
FIG. 3 shows one embodiment of a network device that may be employed in a system implementing the invention.
Figure 4:
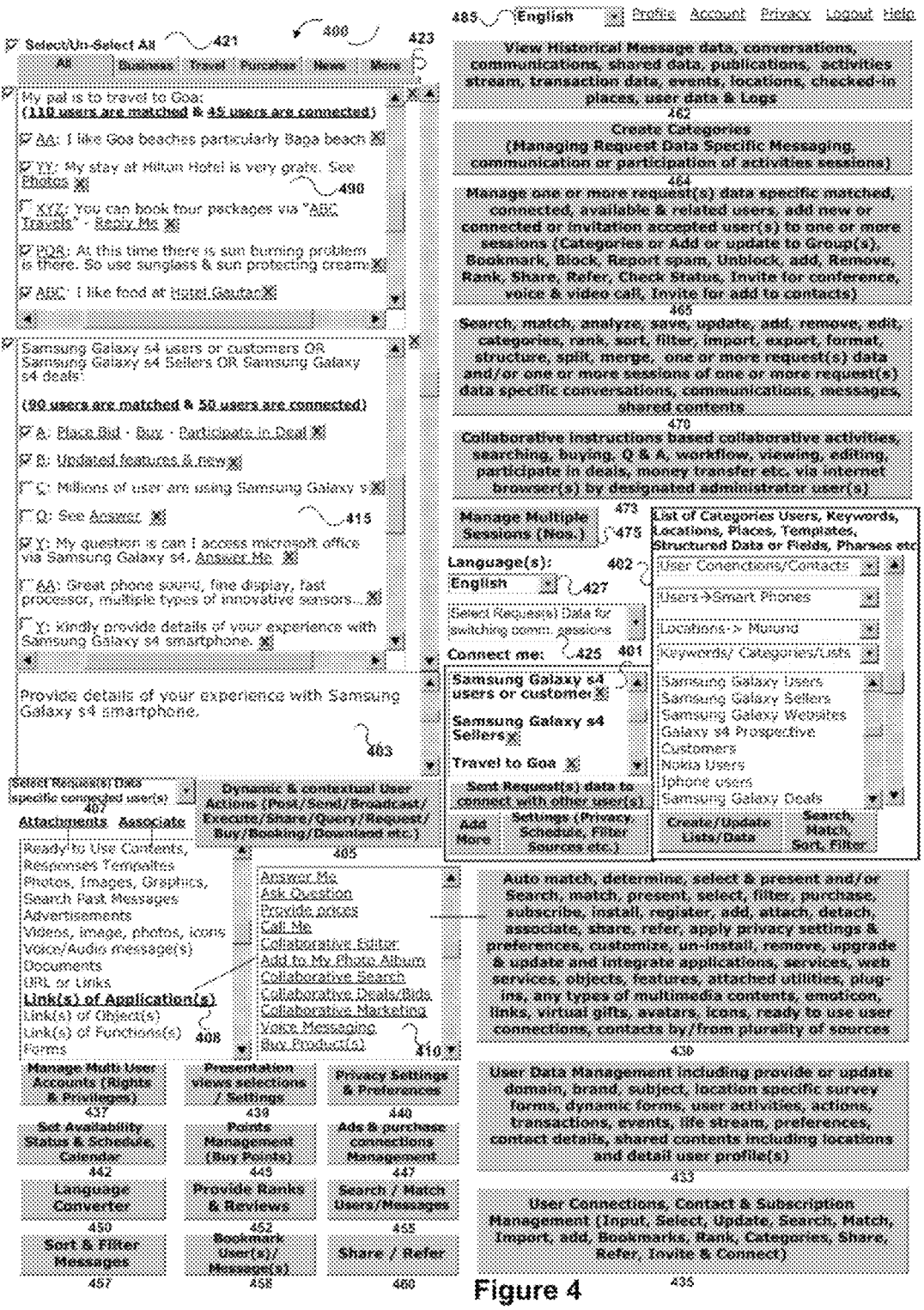
FIG. 4 illustrates exemplary graphical user interface (GUI) for enabling users to dynamically establish contextual connections with other users of network and enabling to communicate, collaborate, participate with activities of/with dynamically connected users.

FIG. 3 shows one embodiment of a network device 300, according to one embodiment of the invention. The embodiment of network device 300 illustrated in FIG. 3 may be used to implement the Anybody to Anybody Connections, Messaging & Communication Server(s) 115 of FIG. 1. Network device 300 may include many more components than those shown. It may also have less than all of those shown. The components shown, however, are sufficient to disclose an illustrative embodiment for practicing the invention. One or more network devices, and the application programs integrated with the devices, may be used to implement the processes of the present invention, as illustrated in FIGS. 4-6 and discussed herein.

In any event, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account managers, and so forth. More detailed discussions of some application programs are included herein.

Mass memory further includes web server 356, data stores 358, and applications 350. Applications 350 are shown to include request(s) data and/or response(s) processor 352, Users, 3rd parties & system Data Processor 354 and Connections, Sessions, Communications & Points Management processor 355. Web server 356 includes virtually any application configured to delivers Web pages and other content to browsers and other client applications via at least the HTTP protocol. However, web server 356 may also be configured to provide scripts, user interfaces, accounting interfaces, editors, security, or the like, to the client application. Moreover, web server 356 may employ a variety of other communication protocols, beyond HTTP. For example, web server 356 may be configured to manage email communication protocols, SMS protocols, IM protocols, or the like. Moreover web server 356 may employ a variety of scripts, applets, programs, or the like, to enable communications of content with a client application.

Data stores 358 may include any of a variety of storage mechanisms, configured to store, and otherwise managed content, applications, scripts, applets, or the like. As such, data stores 358 may be a database, a file structure, or the like. Data stores 358 may store the content into a category structure, such as folders, albums, graphs, trees, or the like, based on a user account, a web service, or the like. In one embodiment, data stores 358 may represent the Data Management services illustrated in FIG. 1, and described in more detail below in conjunction with FIG. 4.

Anybody to Anybody Connections, Messaging & Communication Platform 350 is described in more detail below in conjunction with FIG. 4. Briefly, however, Anybody to Anybody Connections, Messaging & Communication 350 includes a variety of components to provide web services to a user, including Request(s) data and/or response(s) processor 352, Users, 3rd parties & system Data Processor 354 and Connections, Sessions, Communications & Points Management processor 355, Management Interface, search tools, user interfaces, services plug-and-play modules, or the like. Various embodiments of example user interface screens are described in more detail below.

In one embodiment, applications 352 may include Request(s) data and/or response(s) processor 352. An request(s) data and/or response(s) processor 352 may include program logic that performs actions in response to receiving request for matching users for presenting, filtering, identifying, determining, selecting & establishing connections with requestor(s) for conducting communications, messaging, sharing, participate with activities and collaboration among connected users and/or requestor(s) and connected users of network(s) from user(s) or sender(s) client device. These actions may include determining a request data specific connections and connecting matched users with requestor(s) for enabling requestor(s) to select, filter, communicate, receive & send messages, responses, replies, collaborate, share contents, use or access shared applications, services, user profile data.

In one embodiment, applications 350 may include Users, 3rd parties & system Data Processor 354. A Users, 3rd parties & system Data Processor 354 may include program logic that performs actions relating to receiving and processing communications or data related to interactions of user or connected users of users. These actions may include receiving and collecting responses, user interaction data, associating advertising, applying validation, spam control, limits & presentation & privacy settings, preparing response to be sent to the receivers and/or provider(s), or other actions relating to processing communication and responses. These actions are discussed in further detail herein. Though FIG. 4 illustrates Request(s) data and/or response(s) processor 352, Users, 3rd parties & system Data Processor 354 and Connections, Sessions, Communications & Points Management processor 355, the actions and logic of each component may be combined into a single component, divided into multiple components in a different manner, or distributed in a variety of ways across multiple network devices.

Illustrative Operating Environment

Rich (Smart) Client, a Web Client, or a Rich Internet Application (RIA), Website, Web Page and Smart Client Architecture FIG. 4 illustrates Anybody to Anybody Connections, Messaging & Communication management Interfaces or web site(s) or web page(s) or application(s) or service(s) which enables user(s) to register with Anybody to Anybody Connections, Messaging & Communication Server(s) 115 of Anybody to Anybody Connections, Messaging & Communication website(s), application(s), service(s), device(s), database(s), web service(s), application programming interface(s), network(s) & platform(s). In another embodiment non-member or visitor or guest or user(s) of $3^{rd}$ parties' web sites, applications, services, devices, networks, servers & databases can also use Anybody to Anybody Connections, Messaging & Communication management Interfaces or web site(s) or web page(s) or application(s) or service(s) 400. Registered users can log-in 485 with the Anybody to Anybody Connections, Messaging & Communication Server(s) 115 from/via one or more clients, applications, interfaces, web sites, sources, web services, networks & devices. In another embodiment non registered user(s) can access & use Anybody to Anybody Connections, Messaging & Communication management Interfaces 400.

User can enter, input, edit, update, search, match, filter, attach and select from one or more types of lists 402 including connections or contacts list, locations list, categories or keywords or phrases or domain or subject specific pre-created request(s) data or taxonomy or ontology or semantic syntax list & user or system created various types of lists, select keyword(s) via auto-fill list(s), select from historical request data, select from structured data of database(s), prepare, import, select, use & attach one or more types of multimedia data including one or more videos, images, voice, sounds, photos, URLs, links, files, documents, objects and like, select from suggested request data & templates and sent one or more request(s) and/or request(s) data 401 to Anybody to Anybody Connections, Messaging & Communication Server(s) 115 for determining request data 401 specific matched users from pool of users of Anybody to Anybody Connections, Messaging & Communication network(s) 115 and establishing connections among/between requestor(s) and matched or determined users of network(s) and enabling requestor(s) and connected users to send messages, communicate with each other, participate activities of each others, share contents with each other, conduct collaborative activities, actions, events, interactions, transactions, searching, viewing, workflow, tasks and like.

In another embodiment Anybody to Anybody Connections, Messaging & Communication Server(s) 115 and/or connected networks, web sites, users, partners, experts, devices, sensors, modules, databases, applications, web services 115 can monitoring, tracking, detecting, identifying, accepting, collecting, organizing, filtering, orchestrating, recognizing, sensing, recording, indexing, processing and formatting user's one or more activities, actions, events, transactions, requests, search quires, preferences, privacy settings, match making preferences, interactions, behavior, senses, location, places, current location or place, communication, messaging, viewing, collaboration, access, connections, searching, sharing, processing, selections, inputs, tasks, workflows from/with/via/by/to/in/at/within one or more sources, applications, services, objects, profiles, web sites, web pages, sensors, devices, databases, servers, networks, social networks, peer to peer networks and enabling user(s) to send or update request for connecting requestor user(s) with other registered and/or identified user(s) of network(s) and/or automatically sent or update request(s) to enabling user(s) to connect with other registered and/or identified user(s) of network(s). Anybody to Anybody Connections, Messaging & Communication Server(s) 115 determines, identifies, searches, matches, selects users of networks for establishing connection(s) among request(s) and determined, identified and matched users of network(s) and Anybody to Anybody Connections, Messaging & Communication Server(s) 115 can connects determined user(s) with requestor(s) for conducting plurality types of activities, actions, transactions, events, interactions, registering, accessing, messaging, communication, sharing, searching, collaboration and participating activities of each other.

In another embodiment client side logic can verify & validate text of request data, process, format, check spellings, grammar & language of user's structured and/or unstructured request(s) data and associate system data including identify data of user for accessing user's all types of data, information & profile, date & time, language, location of user or requestor(s) and location of request(s) data.

In another embodiment Anybody to Anybody Connections, Messaging & Communication Server(s) 115 can processes request(s) data of user(s) of network(s), wherein processing request data comprising formatting, indexing text data mining including text categorization, text clustering, concept/entity extraction, production of granular taxonomies, sentiment analysis, document summarization, and entity relation modeling (i.e., learning relations between named entities), text analytics including information retrieval, lexical analysis to study word frequency distributions, pattern recognition, tagging/annotation, information extraction, data mining techniques including link and association analysis, visualization, and predictive analytics to turn text into data for analysis via application of natural language processing (NLP) and analytical methods, analysis of data including process of inspecting, cleaning, transforming, and modeling data with the goal of discovering useful information, suggesting conclusions, and supporting decision making, converting to appropriate format including language, voice to text, text to voice, structured data, identify text data in image or video, validating & verifying text language and syntax of text, spell or grammar checking, determining, matching, identifying users or receivers for connecting requester(s) with matched user(s) of network(s) based on plurality types of factors including matching sender user's profile, user data, activities, actions, interactions, behavior, purpose, locations, events & transactions data, location, message(s) contents with prospective receiving users or users of network(s)' data, preferences, privacy settings, profile, location, activities, actions, interactions, behavior, purpose, locations, events & transactions data, calculating points & ranks earned by sender(s) and/or prospective receivers or users of network(s) for identifying & determining targeted receiving users or users of network(s) for connecting requestor with matched or determined users of network(s), identifying availability and presence information of prospective receivers or determined users of network(s), dynamically identifying current or updated priorities and limits of receiving messages of prospective receivers or determined users of network(s), applying privacy settings and preferences, associating metadata including keywords, categories, semantic syntax, ontologies, context data and system data including date & time.

In another embodiment after connecting with request(s) data specific user(s) of network(s), user can sent and/or receives messages, shared contents questions, answers, communicating with each other including sending and/or receiving instant messages, chats, SMS, MMS, video or voice messages, e-mails, streaming videos or IPTVs, selective video life stream of user(s) and/or connected or related users of user, multimedia presentations, customizable automatic replies, call each other, video or voice call each other, conduct meeting or group conference, collaborate with each other for searching, viewing, deciding, negotiating, transacting, buying products & services, participate with deals, participate with each other's activities and search, match, filter, sort, purchase, store, select, attach, detach, associate, apply privacy settings, capture, import, format, edit, update & sent and/or receive, store, edit, update, index, process, use, access, format, share, refer, categories, group(s), sort & filter plurality types of multimedia types of contents including videos, images, graphics, photos, text, rich texts, voice, audio, link, URLs, files, documents, objects, applications, links of applications, services, objects, modules, functions and structured and/or un-structured data including past or historical user data & responses, templates, advertisements, pre-created or dynamically created forms, Products Requirement Specification, Present list of product via web pages or multimedia, Share contents from web, Yellow pages, Dictionaries, News, Microblogging, Comments, Reviews, Status Updates, Publications, Search Results, FAQs, Features, Contacts, Maps & Directions, Blogs, Ready Questions, Ready Answers, Database(s), Search, match & select data records, Ready to use messages, Job Posting, User's Selective Profile, User's Selective Data, Structured Data (XML), Business Card and like 408 & 410.

In another embodiment user can search, match, sort, filter, remove, hide, open, close, minimize, maximize, restore, select various types of views, switch 425 and view each request data specific communication session(s) interface(s) 415 or 490 for communicating, messaging, collaborating, discussing, participate with activities of each other, accessing message associate or attached link(s) associates or referred application(s), web service(s), interface(s), object(s), content(s) and sharing with request data specific connected users.

In another embodiment user can search, match, select, sort, filter, open, re-connect & switch 407 one or more requests data specific identified, bookmarked, matched, selected, ranked & connected users for establishing or continuing or participating or conducting communications, messaging, sharing, one or more types of user activities, actions, instructions, transactions, events, tasks & workflows.

In another embodiment user can search 455, match 455, filter & select one or more persistent or temporary or bookmarked or filtered or searched or matched or ranked connected users 407 and/or communication sessions 415 and/or 419 and/or contents of communication sessions 415 and/or 419 and/or selective user data and/or requests data 425 for taking one or more group actions including sort 457, order, organize, view, filter 457, bookmark 458, share 460, refer 460, synchronize, publish, sent, broadcast, advertise, access associate links, categories, text analysis, text mining, data analysis, data mining, update, remove, import, export, backups, restore, encrypt, decrypt, format, index, process, apply one or more matchmaking & processing functions, settings, applications, services & modules including use language convertor, compare, and provide ranks & reviews 452 and other dynamically provided, updated, integrated, customized & installed group user actions or features or buttons.

In another embodiment user can switch language(s) 427 for drafting request data(s) in particular selected language(s), connecting request data specific users related to that language(s), receiving and/or sending contents in selected language(s), viewing & managing interface functions, contents & option in said selected language(s) and use entire Anybody to Anybody Connections, Messaging & Communication interface(s) or application(s) or service(s) or web site(s) in said particular selected language(s) and enabling localization and/or globalization features.

In another embodiment user can manage 433 and provide plurality types of user data including fill-ups or updates domain, brand, subject, location specific survey forms, dynamic forms, enable to monitor, track, identify, detect, sense, record, process, index, format, save & use or access user activities, actions, transactions, events, life stream, preferences, contact details, any types of user generated contents, user connections, social graphs, shared contents including locations and detail user profile(s) to Anybody to Anybody Connections, Messaging & Communication Server(s) 115 for matching said data said user(s) with request(s)

data and/or user data of other users of network(s) for establishing connection with them.

In another embodiment providing user connections, contact & subscription management interface 435 to user for managing, inputting, selecting, updating, searching, matching, filtering, sorting, ranking, importing, adding, bookmarking, ranking, categorizing, sharing, referring, inviting & connecting user's present persistent connections including connections or affiliations or kinships or relationships with friends, family, colleagues, classmates, associates, relatives, neighbors, employers, employees, like minded users of network(s) and like.

In another embodiment enabling user to auto match, determine, present & select from list 410 and/or search, match, present, select, filter, purchase, subscribe, install, register, add, attach, detach, associate, share, refer, apply privacy settings & preferences, customize, un-install, remove, upgrade & update and integrate link(s) of application(s), object(s), function(s), web service(s), interface(s) & one or more types of multimedia content(s) 410 and/or applications, services, web services, objects, features, attached utilities, plug-ins, any types of multimedia contents, emoticon, links, virtual gifts, avatars, icons, ready to use user connections, contacts by/from plurality of sources 430.

In another embodiment enabling user to search, match, select, attach, integrate & associate one or more accessible link(s) of application(s), object(s), function(s), web service(s) & one or more types of multimedia content(s) 408 & 410 with message(s) or shared content(s) for enabling receiving & viewing user to access link(s) associated or referred or invoked application(s), object(s), function(s), web service(s), interface(s) & one or more types of multimedia content(s) for sent question, provide answer or response, make payments, purchase product(s) and/or service(s), participate in deals or bids, compare products, refer message or user, share contents, reply or forward message, sent virtual gifts or emoticon and participate with one or more types of activities, transactions, communications, collaborations.

In another embodiment enabling user to manage multi user & multi members accounts 437. Multi users management including create, modify & disable users, control which features are available to each user, add specific users to everyone's contact list, set default contacts for new users, provide management of activity log, custom defined management levels, custom default settings and like.

In another embodiment enabling user to set, update, customize, add & apply privacy settings and preferences 440 for allowing persistent or global connected users of user and/or request data specific connected users of user and/or other users of networks and/or users of $3^{rd}$ parties web sites, web pages, applications, services, web services, devices, databases, networks & servers to access, re-share, re-publish, convert, format, import, export, participate, register, making searchable, use, view one or more types of selective user data, connected users' data & user profile, payment information, user requests associate data, user installed applications, services, user activities data, user connections & social graph, user generated data, setting number of users connected to user for each or particular or particular categories or type(s) of request(s), share particular type(s) of content with user(s).

In another embodiment enabling user to set, update, customize, add & apply presentation settings 439 associate with presented, searched, matched, filtered, sorted & selected contents, messages, conversation sessions, applications, user data, user activities logs or life streams, user profiles, user connections, user social graph(s), request data specific connections and communication sessions 490 and/or 415. User(s) is/are also enable to select one or more types of presentation views 439 including multimedia type of view of presentation interface, graphical, tree, explorer, visual, text, web page, web style and associate settings including select fonts, size, style templates etc.

In another embodiment enabling user to search, match, select, share, set, customize, update, broadcast, sent, refer & apply one or more types of presence information or availability status 442 including active, away, busy, at work, at home, available, tired, User is also enable to set availability timings, set date & time of availability, use calendar for set various date & time for various types of availability status.

In another embodiment enabling advertiser user to prepare, draft, update, organize, start, pause, cancel, discard one or more advertisement campaign, advertisement group(s) and advertisements for presenting contextual advertisement(s) 447 to user(s) of Anybody to Anybody Connections, Messaging & Communication network(s), web site(s), web page(s), application(s), interface(s), device(s), database(s), server(s) 115 at one or more advertisement places or spaces or in-line advertisement with messages. Advertisers can provide various advertisement criteria including one or more phrases, keywords, categories, languages & locations of users where advertisers want to display advertisements, set budget & bid of advertisement(s) and like.

In another embodiment enabling user to manage, use, access, share, gift, purchase & view earned points, ranks & weights 445. User can earn points based on user's participation with other users of networks, number of times user spent for communicating, messaging for other users of networks, number of users connected with users, total ranks received by user from other users of networks, number of times other users bookmarked user, number of times other users invite & add user to their contact list, number of comments & reviews provided by other users of network to user, number of times user is referred by other users, number of messages sent by users for other users, total amount of purchase transactions conducted by/via user(s), total number of clicks or impressions on user shared contents received by user, total number or types of actions on shared contents received by user from other users of networks, total number of & duration of communication, connections, messaging & collaborative activity sessions, points purchased or received by user(s) and plurality types of other factors.

In another embodiment enabling user to categories request data and associated or related all communication sessions interface(s), messages, shared contents and conversations of all connected users and enabling to switch categories via tabbed or other type of interface 423.

In another embodiment providing management interface for managing multiple request(s) data associate one or more communication, messaging, activities, collaboration sessions with associated connections including set number of users connected with session, add, update, remove associates connected users and enabling user to manage one or more request(s) data specific matched, connected, available & related users, add new or connected or invitation accepted user(s) to one or more sessions, categories or add or update to group(s), bookmark, block, report as spam, unblock, add, remove, rank, share, refer, check status, invite for conference, voice & video call, invite for add to contacts one or more connections of one or more request data 465.

In another embodiment enabling user to search, match, sort, filter, select & purchase connections 447 of users of networks for sending advertisements, commercial messages, buying request, presenting, marketing, conducting e-commerce transactions & conducting one or more types of activates, events, transactions with connected users including one or more types of or categories of or related to one or more keywords, languages, locations, type(s) of activities, actions, transactions, profile attributes or fields including age range, gender, qualification, income range, purchasing history, range of purchasing amount or total amount of user transactions and one or more other types of customized criteria, rules, conditions, search queries, & preferences including duration of acquiring or using connections, re-sharing or re-sell rights, priority, type of activates and like.

In another embodiment enabling user(s) to search, match, select, categories, access, sort, filter, import, export, format, analyze, data mine, text analysis, process, index, store, share & view historical messages, conversations, communications, shared data, publications, activities stream, transaction data, user locations & checked-in places, user data, user profile, user connections, user social graph & various types of log reports 462.

In another embodiment enabling user(s) to search, match, analyze, save, update, add, remove, edit, categories, rank, sort, filter, import, export, format, structure, split, merge, one or more request(s) data and/or one or more sessions of one or more request(s) data specific conversations, communications, messages, shared contents 470.

In another embodiment enabling user(s) to conduct collaborative instructions based collaborative activities, searching, buying, questioning & answering, workflow, viewing, editing, participate in deals, money transfer etc. via internet browser(s) by one or more users and/or designated administrator user(s) 473.

In another embodiment enabling user(s) to manage & update user profile and user accounts 485.

In implementing various types of embodiment including sending customized and personalized request(s) or request(s) data for connecting users of network(s) with other users of network(s) for establishing connections among them and conducting plurality types of communications, sharing, participations with activities of connected users and messaging, herewith some of the examples illustrates implementing various types of embodiment may comprises, wherein user sends various types of exemplary request(s) to connect with other users of networks including but not limited to are:

1. Connect requesting user with television or stadium viewers of particular sports of particular date & time e.g. cricket, soccer, football, baseball, Olympics for sharing comments, experience, views and scores,
2. Connect requesting user with users who entered in to R-mall for determining prospective customers and make offers,
3. Connect requesting user with users of particular collages and/or school who are at Goa for inviting them for coffee or lunch or dinner or collaborative shopping, 4. Connect requesting user with society members or guest of particular hotels, events etc. for providing feedbacks, suggestions or make complaints,
5. Connect requesting users based on structured language query/queries e.g. user can enter or select SQL Query: Select users from CurrentLocation="Goa" and StayAt="Hotel Rama" or StayAt="Hotel Gautam" for consulting with them regarding hotel, price range and foods,
6. Connect requesting user with users who are using Colgate as toothpaste for sharing reviews and suggesting alternatives, sharing health effect,
7. Connect requesting user with users who are customer or member of particular named shop(s), brand(s), product(s), service(s), companies, web sites, devices, networks, applications for providing customer supports, surveying prospective customers, marketing & selling or e-commerce of products and services,
8. Connect requesting user with users who are currently eating or eat at "Sukh Sagar" for entertainment, comparison and sharing reviews & comments,
9. Connect requesting user with users who are presently stand at iPhone store for purchasing iPhone for sharing thoughts, comparison analysis, viewpoints, usage study, information about new features, available new applications and like,
10. Connect requesting user with provider of particular product(s) and/or service(s) who offers lowest price
11. Connect requesting user with users who are moving via particular type of vehicle at particular road for messaging or communication,
12. Connect requesting user with users who are surround user for enabling to share information about tourist places, shops, hotel menu, particular event and like,
13. Connect requesting user with users who are connected with user for creating social networks, sharing photos, call or video call with connected users,
14. Connect requesting user with family for updating user status,
15. Connect requesting user with user's professional e.g. lawyer, chartered accountants etc. for consulting with them,
16. Connect requesting user with colleagues or classmates or all or selected friends for inviting them for movie,
17. Connect requesting with particular names <at particular time>
18. Connect requesting group(s) of user(s) with prospective buyer(s) who are looking for particular smart phone or mobile or device for providing competitive price and negotiate with them,
19. Connect requesting user with users who are looking for patent attorney for making them client,
20. Connect requesting user with users who are looking for <particular type(s)> of job for interviewing them, request to send profile, finalizing job, negotiate with them for salary and like,
21. Connect requesting user with assistants for booking hotel rooms at "Four Seasons", Hongkong
22. Connect requesting user with users who are interested in cricket for providing commentary,
23. Connect requesting user with users who are in Goa for acquiring various types of knowledge and information from them via questions,
24. Connect requesting user with users who are at particular number of bus at particular time
25. Connect requesting user with users who are also looking for "Samsung Galaxy Smart phones"
26. Connect requesting user with particular <named entities> including user(s) associate with particular company, brand, professional, shop, mall, office, service provider, trust, government office or department, apartment, room number or contact address or physical address of user or entity, school, college, class of particular school, college or class, hotels, restaurants, roads, travel place, airport for conducting various types of activities, events, transactions, organizing & participating with events, communication, collaboration, sharing and like, 27. Connect requesting user with users who are currently purchasing particular product(s) and/or service(s) for providing competitive prices, presenting features, request them to participate with deals wherein deals closes when number of users ordered particular product (s) and/or service(s) included with deal(s) and negotiate with them
28. Automatic connect requesting user with available other users of network(s) who are purchasing or want to purchase or want details for particular product(s) and/or service(s),
29. Connect requesting user with users for booking flight for particular destination for particular date & time
30. Connect requesting user with users who provide me answers for particular question(s) or queries
31. Connect requesting user with 3 users who are speaking Guajarati as well as English languages.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Furthermore, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. Additionally, although the foregoing embodiments have been described in the context of a social network website, it will apparent to one of ordinary skill in the art that the invention may be used with any social network service, even if it is not provided through a website. Any system that provides social networking functionality can be used in accordance with the present invention even if it relies, for example, on e-mail, instant messaging or any other form of peer-to-peer communications, or any other technique for communicating between users. Systems used to provide social networking functionality include a distributed computing system, client-side code modules or plug-ins, client-server architecture, a peer-to peer communication system or other systems. The invention is thus not limited to any particular type of communication system, network, protocol, format or application.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

What is claimed is:

1. A method for connecting a user to contextual users of network, the method comprising:
   a) identify by the server system, user's one or more roles, current activities, prospective activities that user wants to conduct, purposes, relationships, interacted or participated activities, contacts and entities, current or past locations and places, item names, attributes, ontology, profile fields and associated values, date & time and conditions based on structured status, search query, structured request and user data for enabling user to contextually connect with other users of network;
   b) identifying and applying by the server system one or more pre-defined or updated rules and functions via rule-based system and contextual pre-stored connections data based on identified user's one or more roles, current activities, prospective activities that user wants to conduct, purposes, relationships, interacted or participate activities, contacts and entities, current or past locations and places, item names, attributes, ontology, profile fields and associated values, date & time and conditions for enabling user to contextually connect with other users of network;

c) searching and matching by the server system, connectable connections or users of network based on identified user's one or more roles, current activities, prospective activities that user wants to conduct, purposes, relationships, interacted or participate activities, contacts and entities, current or past locations and places, item names, attributes, ontology, profile fields and associated values, date & time, conditions and identified and applied rules and functions;

d) serve by the server system, said searched and matched connectable connections or users of network; and e) enabling by the server system, to auto connect or enabling user to select from said connectable connections or users of network and connecting with said selected connectable connections or users of network.

2. The method of claim 1 wherein, serve by the server system, for user selection or access contextual or connection specific or identified prospective one or more activities or purpose specific or said connected users specific one or more applications, features, options, user actions, interfaces, web services, web page, website, controls, objects, widgets, forms, data or media or content and any combination thereof based on identified user's one or more roles, current activities, prospective activities that user wants to conduct, purposes, relationships, interacted or participate activities, contacts and entities, current or past locations and places, item names, attributes, ontology, profile fields and associated values, date & time, conditions and identified and applied rules and functions for communication, collaboration, sharing, creating connections, social networking, conducting or enable to conduct one or more activities, actions, events, workflow, tasks, transactions, providing or consuming one or more types of user services and participation among connected users.

3. The method of claim 1 wherein, enabling user to prepare structured status and structured request by selecting or selecting from suggested one or more pre-categories and pre-stored and updated parts including name and types of roles, actors, current activities, prospective activities that user wants to conduct, purposes, relationships, interacted or participated activities, contacts and entities, current or past locations and places, item names, attributes, ontology, profile fields and associated values, identities, contextual, form fields and associated values or information, date & time, conditions, preferences, actions, events, status, presence information, transactions, names, nodes, properties, objects, data types, programming syntax, structured syntax, schema, ranges, Boolean operators, keywords, phrases, grammar syntax, semantic syntax, structured query language syntax, requirement specifications, metadata, privacy, settings, rules, commands, groups, categories, taxonomies and types.

4. The method of claim 1 wherein, searching and matching by the server system, connectable connections or users of network based on structured status, search query, structured request, user data, store or updated or real-time identified request, requirement specification, structured query language (SQL) query, search query, templates, domain or field or subject specific forms & associate data, wizard, keywords, category, taxonomy, ontology, semantic syntax, question, pre-identified or pre-stored or pre-configured type of relationships, activities, actions, events, transactions, locations, places, role, task, requirement, entity specific connections or connection possibilities or contextual users for connection, database or data table(s) field(s) and associate value(s), additional requested information from user, date & time, schedule, auto identified needs or interaction or connection requirement base on rules, ontology, metadata, context data, system data, database, past connection logs, past bookmarked connected users, registered with connected users, created connections list, user reference for one or more connections, location, check-in place, status, user availability, online or offline status, user rank, number of points, user selections of one or more preferences, determined domain or subject or location or entity or place or event specific filled partial or full forms, privacy settings, user profile including name, age, gender, language, income range, qualification, education, role & skills information, interest information, employment information or job profile, business information, and information about various interacted or related or participated or transacted entities, user data or user generated or provided or shared or communication or messaging data or auto identified user related data, user contacts & connections, past logs, information or log of user activities, actions, events, transactions, senses, location & updates and any combination thereof.

5. The method of claim 1 wherein, add points to user account based on connect with one or more type or category or context of users of network, number of times & number of duration of participation, conduction of one or more activities, actions, transactions, tasks, workflow, sharing, messaging, ranking, reviewing & communications, user's participation with other users of networks, number of times user spent for communicating, messaging for other users of networks, number of users connected with users, total ranks received by user from other users of networks, number of times other users bookmarked user, number of times other users invite & add user to their contact list, number of comments & reviews provided by other users of network to user, number of times user is referred by other users, number of messages sent by users for other users, total amount of purchase transactions conducted by/via user(s), total number of clicks or impressions on user shared contents received by user, total number or types of actions on shared contents received by user from other users of networks, total number of & duration of communication, connections, messaging & collaborative activity sessions, points purchased or received by user(s) and plurality types of other factors.

6. The method of claim 1 wherein, deduct points from user account based on requesting of connecting with one or more users of network or one or more types of category or context of users of network, requirement or usage of number of times & number of duration of participation, conduction of one or more activities, actions, transactions, tasks, workflow, sharing, messaging, ranking, reviewing & communications from searched or matched or contextually identified or subscribed or selected or connected or purchased connections.

7. The method of claim 1 wherein, enabling user to search, match, invite, request to connect, select, purchase, subscribe, bookmark, bid, allow or dis-allow to access, apply privacy settings, preferences, rules & policy to access, connect, re-connect, dis-connect, add, remove, block, unblock, report, update, show, hide, reconnect, pause, set status, refer, share, rank, sort and filter one or more connected users or connectable users or users of network.

8. The method of claim 1 wherein, configuring the server system for creating and updating of social graph of user(s) and/or network(s) and storing & updating information about and information associate with connections between/among nodes including connected users, identities, named entities or objects, applications, services, profile objects, type of contents, wherein information about connections or log between/among nodes may include monitoring, tracking, sensing, identifying, detecting, recording, storing, indexing, processing, structuring, formatting connected users activities, actions, transactions, contacts, events, interactions, senses, responses, requests, messages, communications, shared contents, behavior, locations, user generated content or data.

9. The method of claim 1 wherein, providing searching functionality to users of network(s) to search & match users of network(s) based on one or more search criteria and preferences and enable to select from searched users of network for establishing connection with them based on invitation and/or purchasing selected connections or subscribing connections for dynamically search, match, use & access connections, wherein purchasing selected connections or subscribing access rights of connecting set of users may comprises using subscribed or purchased selected connections for particular number of times, for particular type of activities, for advertising, marketing & conducting e-commerce transactions, access connection for particular period of time or duration and access as per one or associated, defined, customized rules, policies, agreements, permissions, access rights & privileges, subscription models & privacy settings.

10. The method of claim 1 wherein, enabling advertiser(s) to bid for presenting advertisement or connecting with users or customers or prospective customers for/base on particular keywords, categories, user request data, wherein server matches advertisement criteria including keywords, phrases, categories, location, language and connection requirements with user's data & request(s) data and prioritizing in connecting requestors or users or customers or prospective customers with advertisers or administrators or sales representatives of advertisers based on highest or updated or competitive bid(s) for pay per connection and pay per connected user's action.

11. A system for connecting a user to contextual users of network, the system comprises:
   a) the server system configured to identify user's one or more roles, current activities, prospective activities that user wants to conduct, purposes, relationships, interacted or participated activities, contacts and entities, current or past locations and places, item names, attributes, ontology, profile fields and associated values, date & time and conditions based on structured status, search query, structured request and user data for enabling user to contextually connect with other users of network;
   b) the server system configured to identify and apply one or more pre-defined or updated rules and functions via rule-based system and contextual pre-stored connections data based on identified user's one or more roles, current activities, prospective activities that user wants to conduct, purposes, relationships, interacted or participate activities, contacts and entities, current or past locations and places, item names, attributes, ontology, profile fields and associated values, date & time and conditions for enabling user to contextually connect with other users of network;
   c) the server system configured to search and match connectable connections or users of network based on identified user's one or more roles, current activities, prospective activities that user wants to conduct, purposes, relationships, interacted or participate activities, contacts and entities, current or past locations and places, item names, attributes, ontology, profile fields and associated values, date & time, conditions and identified and applied rules and functions;
   d) the server system configured to serve said searched and matched connectable connections or users of network; and
   e) the server system enabled to auto connect or allowing user to select from said connectable connections or users of network and connecting with said selected connectable connections or users of network.

12. The system of claim 11 wherein, the server system enabled to serve contextual or connection specific or identified prospective one or more activities or purpose specific or said connected users specific one or more applications, features, options, user actions, interfaces, web services, web page, website, controls, objects, widgets, forms, data or media or content and any combination thereof based on identified user's one or more roles, current activities, prospective activities that user wants to conduct, purposes, relationships, interacted or participate activities, contacts and entities, current or past locations and places, item names, attributes, ontology, profile fields and associated values, date & time, conditions and identified and applied rules and functions for communication, collaboration, sharing, creating connections, social networking, conducting or enable to conduct one or more activities, actions, events, workflow, tasks, transactions, providing or consuming one or more types of user services and participation among connected users.

13. The system of claim 11 wherein, user enabled to prepare structured status and structured request by selecting or selecting from suggested one or more pre-categories and pre-stored and updated parts including name and types of roles, actors, current activities, prospective activities that user wants to conduct, purposes, relationships, interacted or participated activities, contacts and entities, current or past locations and places, item names, attributes, ontology, profile fields and associated values, identities, contextual, form fields and associated values or information, date & time, conditions, preferences, actions, events, status, presence information, transactions, names, nodes, properties, objects, data types, programming syntax, schema, ranges, Boolean operators, keywords, phrases, grammar syntax, semantic syntax, structured query language syntax, requirement specifications, metadata, privacy, settings, rules, commands, groups, categories, taxonomies and types.

14. The system of claim 11 wherein the server system configured to search and match connectable connections or users of network based on current or past structured status, search queries, structured requests, user data, store or updated or real-time identified request, requirement specification, structured query language (SQL) query, search query, templates, domain or field or subject specific forms & associate data, wizard, keywords, category, taxonomy, ontology, semantic syntax, question, pre-identified or pre-stored or pre-configured type of relationships, activities, actions, events, transactions, locations, places, role, task, requirement, entity specific connections or connection possibilities or contextual users for connection, database or data table(s) field(s) and associate value(s), additional requested information from user, date & time, schedule, auto identified needs or interaction or connection requirement base on rules, ontology, metadata, context data, system data, database, past connection logs, past bookmarked connected users, registered with connected users, created connections list, user reference for one or more connections, location, check-in place, status, user availability, online or offline status, user rank, number of points, user selections of one or more preferences, determined domain or subject or location or entity or place or event specific filled partial or full forms, privacy settings, user profile including name, age, gender, language, income range, qualification, education, role & skills information, interest information, employment information or job profile, business information, and information about various interacted or related or participated or transacted entities, user data or user generated or provided or shared or communication or messaging data or auto identified user related data, user contacts & connections, past logs, information or log of user activities, actions, events, transactions, senses, location & updates and any combination thereof.

15. The system of claim 11 wherein add points to user account based on connect with one or more type or category or context of users of network, number of times & number of duration of participation, conduction of one or more activities, actions, transactions, tasks, workflow, sharing, messaging, ranking, reviewing & communications, user's participation with other users of networks, number of times user spent for communicating, messaging for other users of networks, number of users connected with users, total ranks received by user from other users of networks, number of times other users bookmarked user, number of times other users invite & add user to their contact list, number of comments & reviews provided by other users of network to user, number of times user is referred by other users, number of messages sent by users for other users, total amount of purchase transactions conducted by/via user(s), total number of clicks or impressions on user shared contents received by user, total number or types of actions on shared contents received by user from other users of networks, total number of & duration of communication, connections, messaging & collaborative activity sessions, points purchased or received by user(s) and plurality types of other factors.

16. The system of claim 11 wherein deduct points from user account based on requesting of connecting with one or more users of network or one or more types of category or context of users of network, requirement or usage of number of times & number of duration of participation, conduction of one or more activities, actions, transactions, tasks, workflow, sharing, messaging, ranking, reviewing & communications from searched or matched or contextually identified or subscribed or selected or connected or purchased connections.

17. The system of claim 11 wherein the server system configured to search, match, invite, request to connect, select, purchase, subscribe, bookmark, bid, allow or disallow to access, apply privacy settings, preferences, rules & policy to access, connect, re-connect, dis-connect, add, remove, block, unblock, report, update, show, hide, reconnect, pause, set status, refer, share, rank, sort and filter one or more connected users or connectable users or users of network.

18. The system of claim 11 wherein the server system configured to create and update social graph of user(s) and/or network(s) and storing & updating information about and information associate with connections between/among nodes including connected users, identities, named entities or objects, applications, services, profile objects, type of contents, wherein information about connections or log between/among nodes may include monitoring, tracking, sensing, identifying, detecting, recording, storing, indexing, processing, structuring, formatting connected users activities, actions, transactions, contacts, events, interactions, senses, responses, requests, messages, communications, shared contents, behavior, locations, user generated content or data.

19. The system of claim 11 wherein user is provided with search functionality to search & match users of network(s) based on one or more search criteria and preferences and enable to select from searched users of network to establish connection with them based on invitation and/or purchasing of selected connections or subscribing of connections for dynamically search, match, use & access connections, wherein purchase selected connections or subscribe access rights of connecting set of users may comprises use subscribed or purchased selected connections for particular number of times, for particular type of activities, for advertising, marketing & conducting e-commerce transactions, access connection for particular period of time or duration and access as per one or associated, defined, customized rules, policies, agreements, permissions, access rights & privileges, subscription models & privacy settings.

20. The system of claim 11 wherein, advertiser adapted to bid to present advertisements or connecting with users or customers or prospective customers for/based on particular keywords, categories, user request data, wherein server matches advertisement criteria including keywords, phrases, categories, location, language and connection requirements with user's data & request(s) data and prioritizing in connecting requestors or users or customers or prospective customers with advertisers or administrators or sales representatives of advertisers based on highest or updated or competitive bid(s) for pay per connection and pay per connected user's action.

\* \* \* \* \*